Sept. 10, 1935.  J. P. TARBOX ET AL  2,014,240
METHOD AND APPARATUS FOR SPOKE WELDING
Filed Jan. 26, 1929  5 Sheets-Sheet 1

INVENTORS.
JOHN P. TARBOX.
ARTHUR F. HANSON.
GEORGE B. REED.
ATTORNEY.

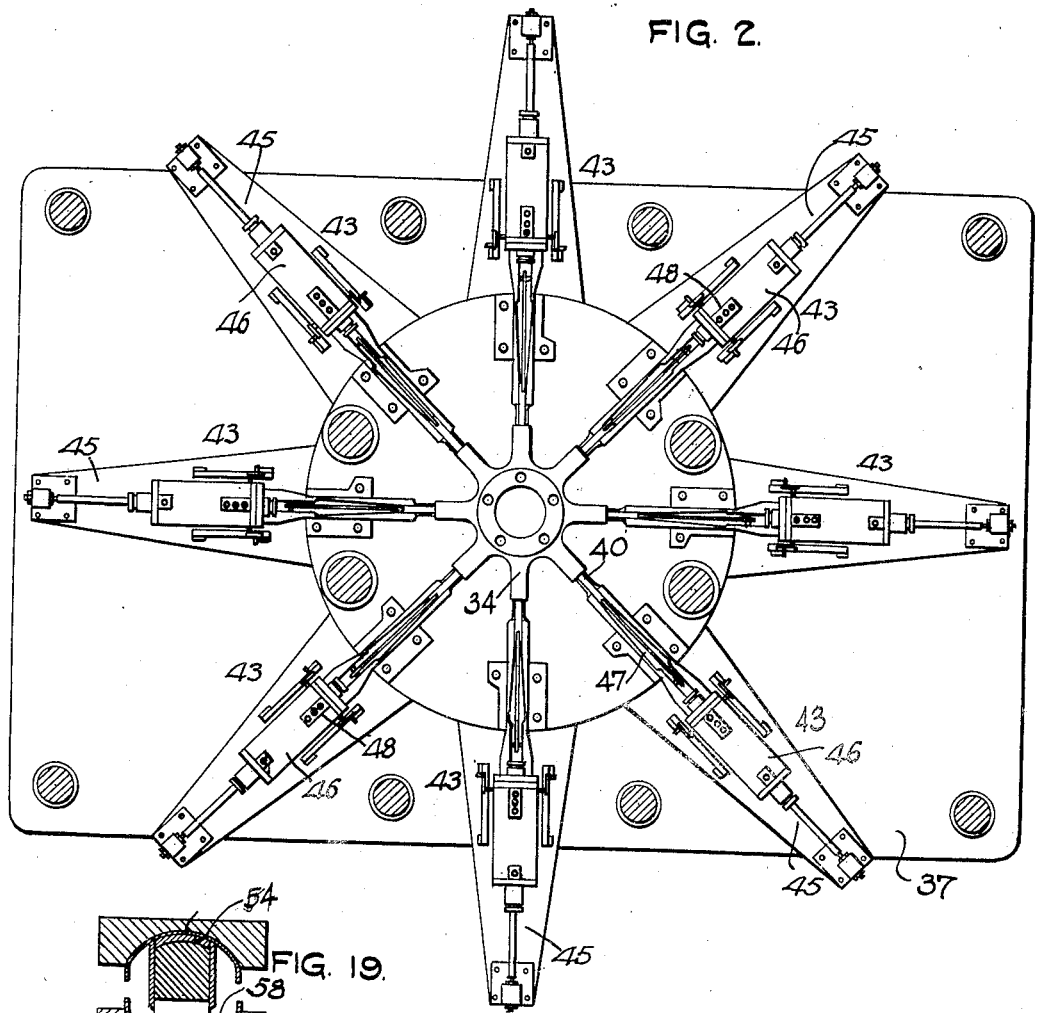

Sept. 10, 1935.   J. P. TARBOX ET AL   2,014,240
METHOD AND APPARATUS FOR SPOKE WELDING
Filed Jan. 26, 1929   5 Sheets-Sheet 3
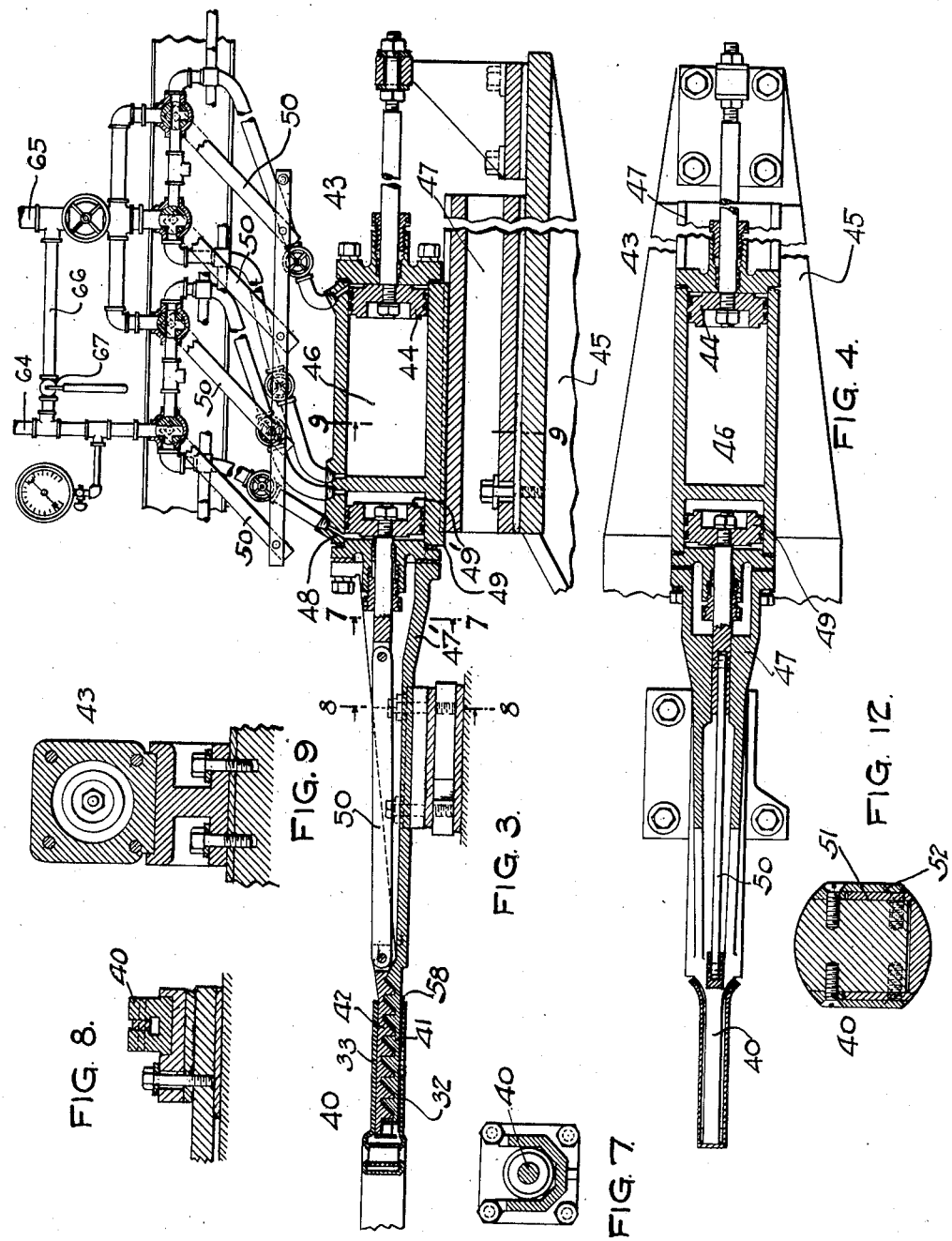
INVENTORS.
JOHN P. TARBOX.
ARTHUR F. HANSON
GEORGE B. REED.
ATTORNEY.

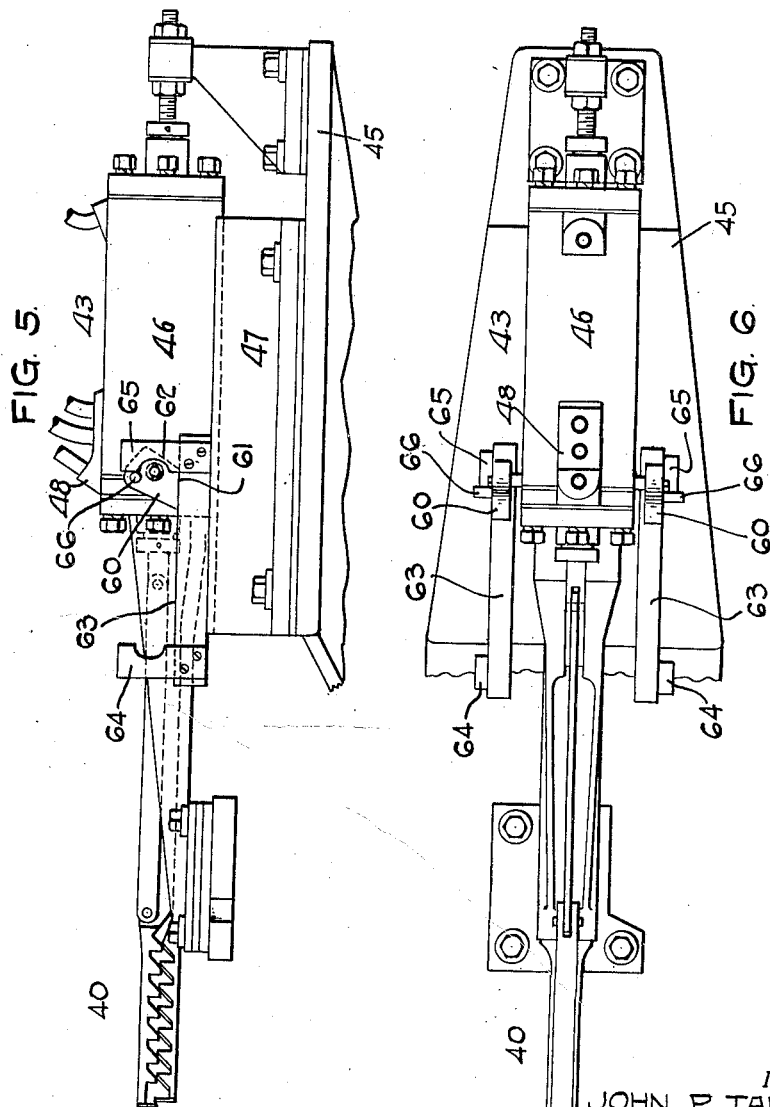

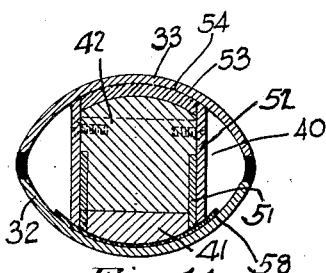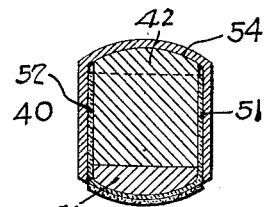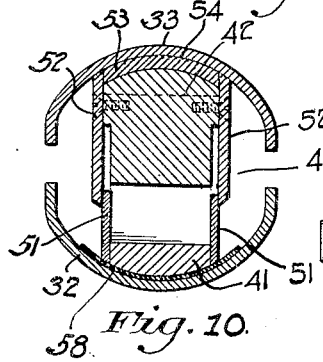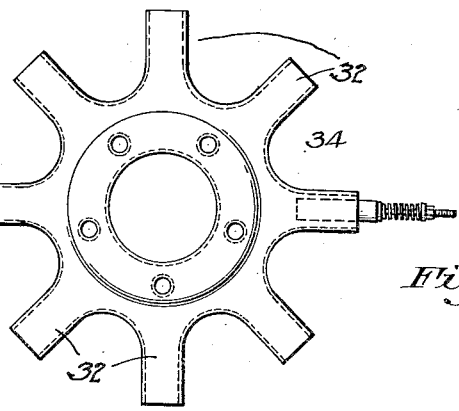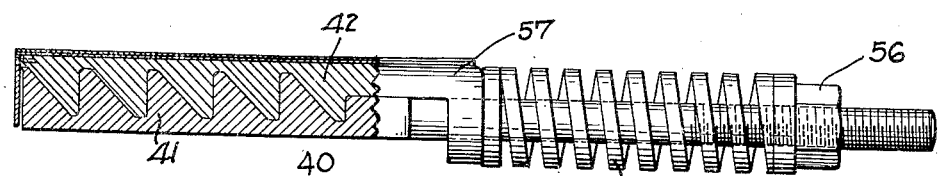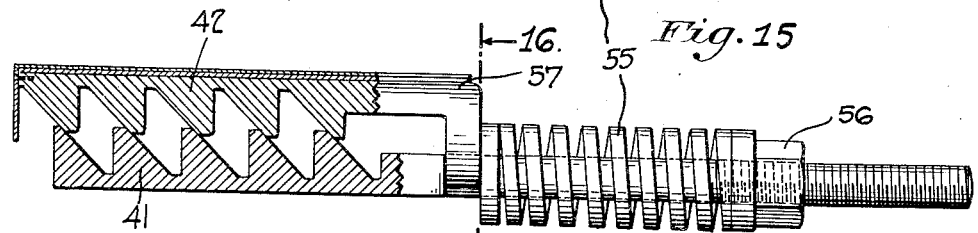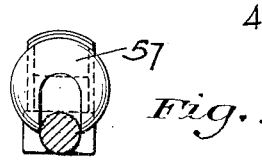

Patented Sept. 10, 1935

2,014,240

UNITED STATES PATENT OFFICE 2,014,240

METHOD AND APPARATUS FOR SPOKE WELDING

John P. Tarbox, Arthur F. Hanson, and George B. Reed, Philadelphia, Pa., assignors to Budd Wheel Company, Philadelphia, Pa., a corporation of Pennsylvania Application January 26, 1929, Serial No. 335,247

26 Claims. (Cl. 219—4)

The method and apparatus for flash welding of our invention relates specifically to machines for fabricating artillery spoked wheels of sheet metal. Fundamentally, however, the problem of flash welding together the elements which go to make up the sheet metal spokes of the form of wooden spokes commonly met with in automobile wheels, is a problem of flash welding together the elements of cross sections relatively small in size and closed or substantially closed. Such cross sections are difficult if not impossible of access interiorly to welding machines of standard form, and are, moreover, difficult, if not impossible, of die clamping engagement externally by the dies of such machines. Even if accessible and engageable, the gauge of the metal used in such structures is often so very light that it is readily distortable under such pressures as are requisite to secure that degree of clamping pressure necessary to maintain efficient transmission of electric current to the elements to be welded. Other difficulties enter the matter, such as the difficulties of alignment, but with these major difficulties in mind, the advantages of our invention will be clear enough to define its merit to those skilled in the art. The prime object of our invention is the overcoming of these difficulties as well as all others incident to the flash welding of such cross sections.

According to the method of our invention, we flash weld together the elements of these closed or substantially closed cross sections of relatively small size by die clamping the elements to be welded, through external die surface engagement generally parallel to the plane of joinder of the elements to be welded and by coacting internally applied clamping force applied through the elements of the sections themselves, independently of the joint between the elements, independently of mechanical connection with the external die surface engagement, and yieldingly applying such force through the approach of the elements to be welded toward each other, preferably externally engaging the elements over an area substantially all-embracing and internally applying the co-acting clamping force over a substantially co-extensive area.

The complemental apparatus for carrying out the method includes opposed externally applied welding dies adapted to subject the opposed elements of the work to opposed external pressures, and an intervened yielding die clamped device adapted to lie internally of the work section. Preferably this yielding die clamping device is in the form of a yielding wedge, in the specific application of the invention to wheels applied longitudinally of the spokes. These die clamped devices are expansible and contractible independently of the opposed die movement to engage and disengage the interior surfaces of the opposed elements to be welded. Furthermore, they are bodily translatable into and out of the space between the elements of the section. A motor actuator effects such translation, and a second motor actuator effects expansion and contraction. The expansion and contraction actuator is itself bodily translatable by the translation actuator along with the die clamped device.

In the accompanying drawings we show that form of our invention now best known to us but quite obviously there are other forms, one or more of which we shall illustrate, but all of which it is the proper function of the claims annexed to protect us insofar as they partake of the generic spirit of our invention at large.

Figure 2 is a transverse cross section intermediate the opposed external dies approximately on the line 2—2 of Fig. 1.

Figure 3 is a vertical cross section of a yielding die clamping device and its associated actuators.

Figure 4 is a horizontal cross section of the actuators of Fig. 3 with the associated die clamping device shown in plan view.

Figure 5 is a side elevation of the device actuators of Figures 3 and 4.

Figure 6 is a top plan view of the same.

Figures 7 to 9 are respectively cross sections on lines of the same designations, particularly Figs. 3 and 4, but also in certain other figures.

Figures 10 and 11 are respectively cross sections of the yielding internal die clamped device in co-action with the elements of the cross section in expanded and contracted conditions.

Figure 12 is a cross section of a modification of such device in contracted condition.

Figure 13 is a similar cross section of a still further modification.

Figures 14 and 15 are longitudinal elevations particularly in vertical section of yet another modification of the yielding internal die clamped device.

Figure 16 is a sectional detail on line 16—16 of Fig. 14.

Figure 17 is a plan view of a spoked wheel showing the application of the device of Figs. 14 and 15.

Figure 1:
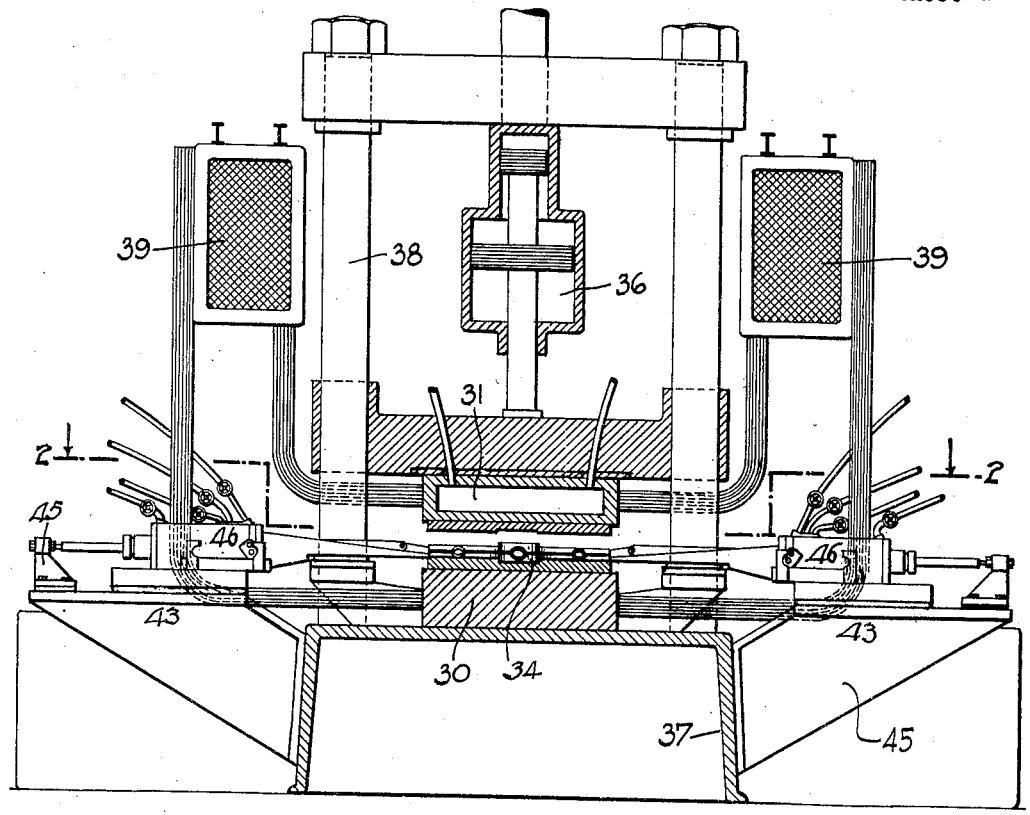
Figure 1 is a vertical cross section of the apparatus.
Figure 18:
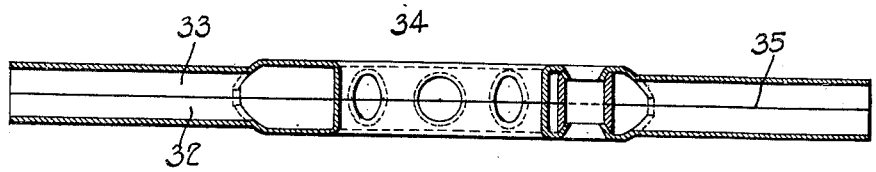
Figure 18 is a transverse diametrical cross section of a spoked wheel fabricated by my improved method.

Figures 19 to 22 inclusive are views showing various stages of welding as effected by my method and apparatus.

An understanding of the apparatus will facilitate and render shorter an adequate disclosure of the method.

Flash welding machines as usually constructed and operated comprise clamping dies in general engaging the work in general in planes substantially at right angles to the plane of joinder of the parts. Take for example, the usual flash welding of large stampings of relatively open cross section. Welding dies mechanically clamp to opposite sides of each element as close as possible to the plane of joinder consistent with proper margin for the welding operation, heat conditions, clearance, etc. The dies and the work which they carry are moved relatively toward each other, also substantially at right angles to the plane of joinder of the work. In the machine which we use, however, the dies embrace the elements of the cross section in general in planes substantially parallel to the plane of joinder.

In our machine there is provided a lower fixed die 30 and an upper movable die 31. Each is provided with engaging surfaces complemental to the surface of the element of the cross section with which it is to make welding die contact. In the case illustrated, the wheel to be fabricated comprises two die stampings 32—33 constituting sheet metal halves of a spoked wheel structure 34 divided into halves in the median plane 35 of the structure. As clearly appears in Figs. 19 to 22, the dies 30 and 31 substantially completely embrace the external surface area of the relatively small spoke sections. But there is clearance between them sufficient at each joint to meet the conditions usually found in flash welding as above outlined.

These dies are opposed and are relatively approachable and recedable from each other by means of the hydraulic motor 36 from the piston of which the movable die 31 is supported. A base 37 immediately supports the fixed die 30, and pillars 38 erected upon the base not only support the motor 36 but also guide through an appropriate head the upper die 31.

Welding current is supplied to the dies from an annularly disposed series of transformers 39 the terminals of each of which are respectively connected to dies 30 and 31 in such manner that current will be passed in a circuit including the elements of the cross section to be welded in series. The connections of the transformers to the dies will be angularly distributed in such manner as to secure a most uniform application of welding current.

The machine in general so far described as distinguished from the die device heretofore described and of the apparatus to be described henceforth is not of our invention but is adapted by us for combination with the dies and apparatus of our invention.

Intervened between the dies 30 and 31 in axial extension of each spoke of the wheel specifically illustrated is one of the yielding die clamping members referred to. These are generally designated wherever they appear in Figs. 3 to 13 by numeral 40. This device is an expansible and contractible wedge comprising lower and upper parts 41 and 42 respectively, having multiple steps for the purpose of securing maximum contraction and expansion with minimum relative movement of the parts. In cross section as shown in Figs. 10 and 11, the wedge is relatively small, smaller in area than the internal area of the cross section 32—33 to be welded, especially when contracted. In length the device is substantially the full length of the section of the work to which it is applied, in this instance the wheel spoke. The upper end lower surfaces of the members 41—42 are conformed to the internal surfaces of the elements 1 of the section 32—33 over an area approaching in extent the area of engagement of the welding dies 31 as can be seen clearly in Figs. 19 to 22.

These expansible and contractible devices 40 are bodily translatable axially into and out of the interior of the work sections by radially disposed translation actuators 43 in the form of compressed air motors, the pistons 44 of which are anchored to extensions 45 of the base 37 of the machine and the cylinders 46 of which are axially reciprocable on guides 47. This motor mechanism is insulated from the base extensions 45. This translation actuator 43 carries the wedge 40 by a long armed extension 47' from the fore end of the cylinder 46 in such alignment that on reciprocation of cylinder 46 translation of the wedge 40 into and out of the work section is achieved.

Each translation actuator 43 carries at its fore end an extension and contraction actuator 48 also in the form of a compressed air motor. It comprises cylinder 49 in integral extension of the cylinder 46 and piston 49'. Extension 47' is connected with the lower member 41 of device 40. Piston 49' is connected by link 50 with the upper member 42 in such manner that when compressed air is admitted to the near side of piston 49', member 42 is drawn outwardly and expands device 40, while when this pressure is relieved and pressure admitted to the outside end of cylinder 49, member 42 is projected inwardly and device 40 contracted. By maintaining pressure on the inner side of piston 49', device 40 is yieldingly maintained in an extended condition as shown in Fig. 5. The annular series of actuators 43, grouped about the body of the machine as clearly appearing in Fig. 2, are connected together for simultaneous operation by the system of conduits controlled by common valves as shown in Fig. 3. This need not be described in detail save to say that all similar inlets and exits to the various actuators are multiplied together and controlled from the same valve, and that all the valves are commonly controlled by a system of inter-linkage 50 between them.

The form of the device 40 shown in Figs. 10 and 11 comprises guide plates 51—52 on opposite sides of the members 41—42 respectively, the plates being arranged to bear upon each other and maintain elements 41—42 in alignment. A similar arrangement is used in the modifications of Figs. 12 and 13. But in the modification of Figs. 10 and 11 a wearing plate 53 is used on the top member 42. This plate is intended to take the wear of the device in contact with the upper of the elements to be welded. In the form shown in Fig. 13 the inner guide plates 51, 52 connected with the bottom member 41 are composed of fiber and completely embrace the lower member 41 and insulate it from the upper member 42. The outer sides of the guide plates 52 are integral sides of a U shape overlying guide structure 54 having the joint function of guiding and by its upper surface taking the wear incident to work engagement. The under surface of the plate structure 51, 52 in Fig. 13 is metal coated by spraying of metal to better withstand wear in contact with the lower member of the section. It is found that a finished article of superior quality is obtained if the inner portions of the sections to be welded are bent at a substantial right angle to the welding axis as shown in Fig. 10. This gives a plane contact with substantial extent for the flashing operation. A large portion of the metal is burned away during the flashing and this straight surface is therefore essential to the effective operation of the machine.

The form of device 40 shown in Figs. 14, 15 and 16 may in its essential respects be like any of those previously described. But the expansion and contraction actuator instead of being a compressed air member is in the form of a spring 55 axially disposed between the members 41 and 42 of the wedge structure and engaging them respectively through the associated abutments 56 and 57. Such a yielding expansible and contractible device may be manually translated into and out of the sections to be welded after the manner illustrated in Fig. 17.

In the operation of our machine opposed dies 30 and 31 are receded from each other. The devices 40 are translated outwardly beyond the zone of the dies 30—31 by actuators 43 and are in the contracted condition. The lower element of the cross section to be welded is then put in place upon the lower die 30 of complemental element embracing form. In the instance of devices 40 of the form of Figs. 10 and 11 leaves of insulation 58 are then laid upon the internal surfaces of the element, along the entire length of each spoke in the article illustrated. These leaves are of sufficient width and length to effectually insulate devices 40 when applied from the lower element 32. Thereupon actuators 43 are energized to translate elements 40 axially radially inwardly of the elements 32 of the cross section. Simultaneous with this translation movement, or at any time after commencement thereof that may be preferred, actuators 48 are energized to expand devices 40 to the condition shown in Fig. 10 and Fig. 14. Thereupon the upper element 33 of the cross section is laid upon the top surfaces of members 40. Following this the upper die 31 is moved downwardly under the urge of motor 36 and engages the element 33. The welding control circuits being closed and operated under a control manual or automatic properly coordinated with the motor control 36, the elements 33—32 are approached toward each other against the yielding resistance of devices 40, contraction of which is opposed by the energized actuators 48 (or 55 in the form of Figs. 14–15), flash welding contact is effected in the plane of joinder 59 between the parts (Figs. 19 to 22) and the flash weld is effected by the well known process. During this flash welding operation the resistance offered by members 40 to the approach of elements 32—33 of the sections toward each other under the approach of the dies 30—31 is sufficiently great to strongly clamp the elements 32—33 respectively to the upper and lower opposed externally applied dies 30—31. The weld completed, actuators 48 are energized to contract the members 40, and the actuators 43 to translate them radially without the section. This action may take place simultaneously. Simultaneously also or thereabouts member 36 is energized to retract the upper external die 31 from the lower die 30. The completed product is then removed from the machine.

The method carried out by this apparatus is that which we have described. The relatively small cross section of the work, in this case a closed such cross section, is effectually welded. First the elements of the cross section 32—33 to be welded are die clamped by external die surface engagement generally parallel to the plane 59 (see Figs. 19 to 22) of the flash welding and by co-acting internally applied die clamping pressure force applied through the elements of the sections themselves, independently of the joint between the elements, independently of mechanical connections with the external die surface engagement, by yieldingly opposing the approach of the elements toward each other. The die engagement is an embracing engagement comprehending substantially the entire area of the relatively small cross section in general alignment with the plane of the weld and generally overlying that plane. The steps preparatory to the performance of the actual welding operation comprise the simultaneous translation of the internal clamps into the opposed spoke portions and the setting up of the yielding force in coaction successively with the elements 32 and 33. It is to be noted that the insulation 58 effectively limits the current flow to a path passing through the joints themselves.

It should be noted that the operation of the machine is improved by the following detailed features of the apparatus if the wedge 40 on its translation into the body of the spoke is translated in a raised position. This is accomplished. Such translation avoids contact with and displacement of the insulation 58 which is placed in the bottom of the lower stamping. Such translation is accomplished by the shiftable dog type guide 60, one attached to each side of the cylinder 46, each guide having slide faces 61 and 62 at different radii adapted to slide upon the guideway 63. Detents 64 and 65 at opposite ends of the slide are arranged to strike upon a pin 66 on the dog 60, and alternately shift the dog to its obverse and reverse positions. During the translation of wedge 40 outwardly of the spoke, the lower surface 62 is in engagement with guideway 63 and during translation in the reverse direction surface 61 is in engagement with the guideway, and the wedge is raised above the lower stamping 32 in place on the die 30.

While the wedge 40 is at work in clamping the stamping elements 32—33 to the dies 30, 31, a pressure reduced from a relatively high pressure commonly found in compressed air mains is ordinarily amply sufficient, therefore connection of the front end of the piston 49' of the air motor 49, 49' is by way of a line 64 supplying air under reduced pressure. Connection of the rear end of the piston 49', however, is to the main, 65, delivering high air pressure, and therefore high pressure obtains in this end of the cylinder. Accordingly, when the wedge is to be collapsed high pressure is used and any tendency to jamb or any sticking of the wedge incident to the welding operation or to whatever cause is prevented from holding the wedge against withdrawal. Then too this high pressure insures such rapidity of action that the simultaneous motion of translation of the wedge out of the body of the spoke is not interfered with. A connection 66 normally closed by a valve 67 may be introduced between the high pressure main 65 and the low pressure line 64, so that high pressure air may, if desired, be readily introduced, when needed, in front of piston 49'.

The product produced by this method has been found to be a perfect one possessed of a perfect welded joint free from distortion at the joint or elsewhere in the welded section. It is producable by this process and apparatus at an extremely rapid rate and with great economy.

What we claim as new and useful and desire to protect by Letters Patent is:

1. A method of butt welding hollow segments along their edges which comprises exerting opposed pressures upon at least one of said segments internally and externally along a substantial portion of its extent, thus clamping it and adjusting it to welding position relative to the second segment, and passing a welding current through the segments to be joined, one of said pressure applications being yielding controllably by the other in the course of a welding operation.

2. A method of flash welding hollow segments along their edges which comprises exerting opposed pressures upon at least one of said segments internally and externally along a substantial portion of its extent thus clamping it and adjusting it to welding position relative to the second segment and welding said segments together along their edges and in the course of said welding maintaining one of said pressures superior to the other.

3. A method of welding hollow segments along their edges comprising exerting opposed pressures upon at least one of said segments internally and externally along a substantial portion of its extent in a direction generally perpendicular to the plane of joinder thus clamping it and adjusting it to welding position relative to the second segment, and welding said segments together along their edges while maintaining a differential active pressure during said welding operation.

4. A method of welding hollow segments along their edges which comprises exerting opposed pressures upon at least one of said segments internally and externally along a substantial portion of its extent thus clamping it and adjusting it to welding position relative to the second segment, exerting internal pressure upon the second segment to hold it stationary on its support and welding said segments together along their edges while maintaining active differential yielding pressures as to said segments.

5. The method of welding together two spider shaped members of hollow cross section which comprises exerting opposed pressures upon at least one of said members internally and externally along a substantial portion of its extent, thus clamping it and adjusting it to welding position relative to the second member, and welding said members together along portions of their edges, said pressures being differential and yielding in the direction vertical to the plane of joinder.

6. The method of welding together two spider shaped members of hollow cross section which comprises exerting opposed pressures upon at least one of said members internally and externally along a substantial portion of its extent in a direction generally perpendicular to the plane of joinder, and welding said members together along portions of their edges while maintaining said pressure biased in the direction of motion.

7. A flash welding apparatus comprising opposed externally applied welding dies adapted to subject the work to opposed external pressure, means for causing relative approach and recession of the welding dies, an intervened yielding die clamp device adapted to lie internally of the work section, and means for passing a welding current through said work.

8. A flash welding apparatus comprising opposed externally applied welding dies adapted to subject the work to opposed external pressure, means for causing relative approach and recession of the welding dies, an intervened yielding die clamp device in the form of a wedge adapted to lie internally of the work section, and means for passing a welding current through said work.

9. A flash welding apparatus comprising opposed externally applied welding dies adapted to subject the work to opposed external pressure, means for causing relative approach and recession of the welding dies, an intervened yielding die clamp device, expansible and contractible independently of opposed die movement, and adapted to lie internally of the work section and means for passing a welding current through said work.

10. A flash welding apparatus comprising opposed externally applied welding dies adapted to subject the work to opposed external pressure, means for causing relative approach and recession of the welding dies, an intervened yielding die clamp device adapted to lie internally of the work section and bodily translatable into and out of the section, and means for passing a welding current through said work.

11. A flash welding apparatus comprising opposed externally applied welding dies adapted to subject the work to opposed external pressure, means for causing relative approach and recession of the welding dies, an intervened yielding die clamp device, expansible and contractible independently of opposed die movement, adapted to lie internally of the work section, and bodily translatable into and out of the section, and means for passing a welding current through said work.

12. A flash welding apparatus comprising opposed externally applied welding dies adapted to subject the work to opposed external pressure, means for causing relative approach and recession of the welding dies, an intervened yielding die clamp device, expansible and contractible independently of opposed die movement, adapted to lie internally of the work section, and bodily translatable into and out of the section, actuator means for bodily translating said die clamp device into and out of the section, and means for expanding and contracting said actuator means and itself translated with the die clamp device.

13. A flash-welding apparatus comprising opposed externally-applied welding dies adapted to subject the work of opposed external pressure, means for causing relative approach and recession of said dies, an intervened yielding die clamp device adapted to lie internally of the work section and bodily translatable into and out of working position, and means for translating it into the working position on an elevated plane and withdrawing it on a lower plane.

14. A flash-welding apparatus comprising opposed externally-applied welding dies adapted to subject the work to opposed external pressure, means for causing relative approach and recession of said dies, an intervened expandible and collapsible die clamp device adapted to lie internally of the work section and bodily translatable into and out of the section, and fluid-pressure means operating under differential pressures to expand and collapse said die clamp device.

15. A welding apparatus for forming a spider having hollow radial portions from two substantially duplicate spiders having segmental radial portions comprising a pair of opposed welding dies, and a plurality of radially insertable members adapted to enter the ends of the superposed duplicate spiders, and adjustable to the inner dimension of said ends to space and clamp the same between the dies and said insertable members.

16. A welding apparatus for forming a spider having hollow radial portions from two substantially duplicate spiders having segmental radial portions comprising a pair of opposed welding dies, and a plurality of radially insertable and expandible members adapted to enter the ends of the superposed duplicate spiders, to space and clamp the same between the dies and said insertable members.

17. A welding apparatus for forming a spider having hollow radial portions from two substantially duplicate spiders having segmental radial portions comprising a pair of opposed welding dies, and a plurality of radially extending members adapted to lie between the ends of the superposed duplicate spiders, and adjustable to the inner dimension of said ends to space and clamp the same between the dies and said radially extending members.

18. A welding apparatus for forming a spider having hollow radial portions from two substantially duplicate spiders having segmental radial portions comprising a pair of opposed welding dies, and a plurality of radially extending expandable members adapted to lie between the ends of the superposed duplicate spiders, and adjustable to the inner dimension of said ends to space and clamp the same between the dies and said radially extending expandable members.

19. A welding apparatus for forming a spider having hollow radial portions from two substantially duplicate spiders having segmental radial portions, comprising a pair of opposed welding dies, a plurality of radially insertable members adapted to enter the ends of the superposed spiders and adjustable to the inner dimension of said ends to space and clamp the same between the dies and said insertable members and means for synchronously inserting and withdrawing said radial members.

20. A welding apparatus for forming a spider having hollow radial portions from two substantially duplicate spiders having segmental radial portions comprising a pair of opposed welding dies, a plurality of radially insertable and expandable members adapted to enter the ends of the superposed duplicate spiders and adjustable to the inner dimension of said ends to space and clamp the same between the dies and said insertable members, and means for synchronously inserting, expanding, collapsing and withdrawing said members.

21. The method of forming hollow tubular bodies which comprises forming said tubular bodies in opposed segmental portions, arranging said segmental bodies in opposed relationship, effecting the approach of welding electrodes into contact with the respective bodies and opposing the approach of the bodies under the influence of the welding electrodes by means of yielding pressure exerted internally thereagainst.

22. The method of welding together segmental members to form a hollow body which comprises superposing said bodies in opposed relationship, flash welding adjacent segmental members, and concurrently exerting yielding pressure internally thereof against one of said members during the welding operation.

23. Apparatus for making welded substantially tubular members comprising a yieldable mandrel having a plurality of independent movable sections, electrodes adapted to engage tubular sections on the mandrel, and means for relatively moving the electrodes to press the sections together and contract the mandrel.

24. Apparatus for making welded substantially tubular members comprising electrodes and holders for surrounding tube sections, and a mandrel having relatively movable portions effective for pressing substantially the entire circumference of the sections against the electrodes and holders.

25. Apparatus for making welded substantially tubular members comprising electrodes including gripping jaws for engaging tube sections and an expanding mandrel having portions effective for pressing the sections against the electrodes, and means for causing relative movement of the electrodes.

26. In a method of welding substantially tubular members, the steps including assembling substantially semi-cylindrical tube sections edge to edge, pressing said sections together and applying electrodes to the edges thereof, forcing the edges of the said sections against said electrodes, heating said edges electrically while continuing to press them together so as to cause the sections to move together and effect welding thereof.

JOHN P. TARBOX.
ARTHUR F. HANSON.
GEORGE B. REED.